(12) United States Patent
Kaiser et al.

(10) Patent No.: US 7,036,542 B2
(45) Date of Patent: May 2, 2006

(54) NONSKID DEVICE FOR THE WHEELS OF VEHICLES

(75) Inventors: Helmut Kaiser, Aalen (DE); Werner Degner, Kirchheim a. R. (DE)

(73) Assignee: RUD-Kettenfabrik Rieger & Dietz GmbH u. Co., Aalen-Unterkochen (DE)

( * ) Notice: Subject to any disclaimer, the term of this patent is extended or adjusted under 35 U.S.C. 154(b) by 98 days.

(21) Appl. No.: 10/484,053

(22) PCT Filed: Jul. 24, 2002

(86) PCT No.: PCT/DE02/02788

§ 371 (c)(1),
(2), (4) Date: Jan. 16, 2004

(87) PCT Pub. No.: WO03/011618

PCT Pub. Date: Feb. 13, 2003

(65) Prior Publication Data

US 2004/0163747 A1    Aug. 26, 2004

(30) Foreign Application Priority Data

Jul. 26, 2001  (DE) ................................ 101 37 512

(51) Int. Cl.
*B60C 27/14*   (2006.01)
(52) U.S. Cl. ................... 152/218; 152/225 C; 152/233
(58) Field of Classification Search ............... 152/217, 152/218, 219, 225 C, 233
See application file for complete search history.

(56) References Cited

U.S. PATENT DOCUMENTS

| | | | | |
|---|---|---|---|---|
| 2,517,634 A | * | 8/1950 | Daley | 152/216 |
| 2,575,263 A | * | 11/1951 | Eisenhauer, Sr. | 152/225 R |
| 2,826,232 A | * | 3/1958 | Korn | 152/217 |
| 4,098,314 A | * | 7/1978 | Welsh | 152/216 |
| 4,862,936 A | * | 9/1989 | McDonough | 152/216 |
| 4,922,982 A | * | 5/1990 | Metraux | 152/216 |
| 5,254,187 A | * | 10/1993 | Metraux | 152/216 |
| 6,619,353 B1 | * | 9/2003 | Kim | 152/225 R |

FOREIGN PATENT DOCUMENTS

| | | |
|---|---|---|
| DE | 88 16 243 | 4/1990 |
| DE | 40 18 415 | 10/1991 |
| DE | 41 27 448 | 2/1993 |
| EP | 0 352 874 | 1/1990 |

* cited by examiner

*Primary Examiner*—Russell D. Stormer
(74) *Attorney, Agent, or Firm*—Mark P. Stone

(57) ABSTRACT

A nonskid device for the wheels of vehicles, has a holding element (1) situated in the region of the wheel axis and used with elastic holding arms (2) holding a chain mesh (4). A tension cable (7) is used to introduce tension forces into the holding arms (2). In order to introduce a defined tensile stress into the tension cable (7), the tension cable is connected to a pivotable tension lever (12).

20 Claims, 9 Drawing Sheets

NONSKID DEVICE FOR THE WHEELS OF VEHICLES

TECHNICAL FIELD

The invention relates to a nonskid device for vehicle wheels, with a holder, coming to rest in the region of the wheel axis in the mounted state and rotatable with respect to the wheel, for at least three holding arms, extending radially outward, for holding nonskid means distributed over the wheel circumference, and with a tension cord which serves for the introduction of tension forces into the holding arms and connects the holder to the wheel and which runs from the center of the holder via a first deflection to a second deflection located in the edge region of the holder.

PRIOR ART

A nonskid device of the above type is known from DE 4018415 C1. In the known nonskid device, a tension cord is formed by a chain or rope provided at one end with a flat band portion and is detained in its tension position either by means of a detent pawl in the center of the holder or by latching members in the region of the second deflection or by a rope pulley capable of being clamped, using a clamping nut, and forming a kind of second deflection. It is known, moreover, specifically from DE 41 27 448 A1, to use a rubber sling as a tension cord. All the above-mentioned solutions are not entirely satisfactory either in terms of ease of operation or with regard to their functioning, and, in particular, it proves a disadvantage that the tensions which take effect in the holding arms vary within undesirably wide limits as a function of the potential force exerted by the user of the nonskid device.

PRESENTATION OF THE INVENTION

The object on which the invention is based is to provide a nonskid device of the type under consideration, which can be mounted easily and which makes it possible to apply essentially constant tension forces.

The above object is achieved, according to the invention, in that, in a generic nonskid device, the tension cord is led from the second deflection to at least one detaining member on a tension lever which is mounted pivotably on the holder at a distance from the second deflection and by means of the pivoting movement of which a pull can be introduced into the tension cord.

The device according to the invention affords the advantage that, after the presetting of the tension cord length to the respective wheel/tire combination, said device can initially be fastened to the wheel easily, without the need for applying tension forces, and that an essentially identical tension force dependent on the dimensions and position of the tension lever is generated, by the introduction of a pivoting movement into said tension lever, only after the device has been fastened. The presetting in this case needs to be carried out once only, at least for the winter season, as a function of the vehicle type and the tires.

Further features and details of the invention may be gathered from the subclaims and the following description of an embodiment of the invention which is illustrated in the accompanying drawings.

EMBODIMENTS OF THE INVENTION

Figure 1:
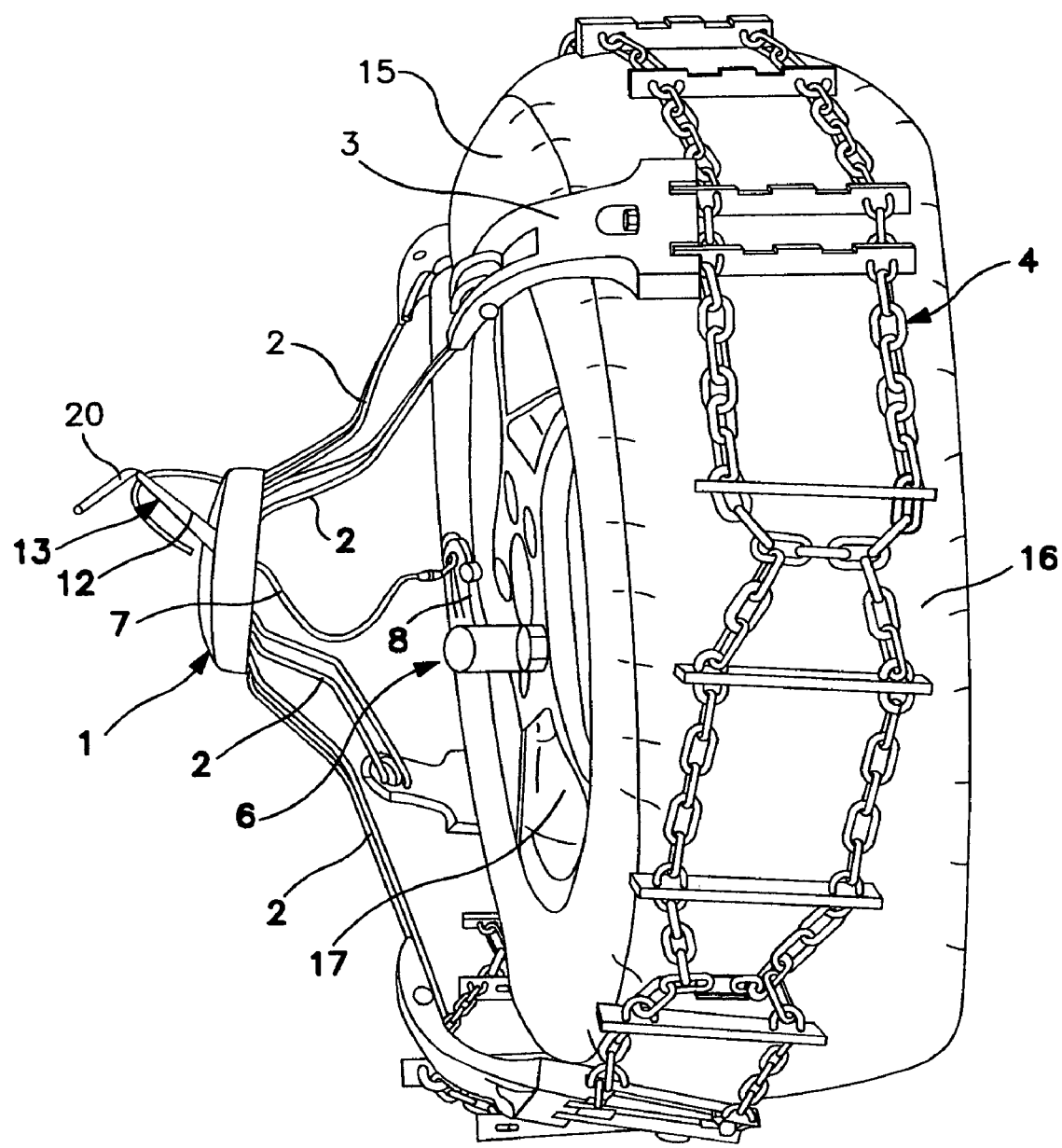
FIG. 1 shows the perspective view of a nonskid device slipped onto the vehicle tire in a first mounting step.

FIG. 1 shows a nonskid device with a holder 1 for four resiliently designed holding arms 2 which extend radially outward from the holder 1 and are formed by wire straps and which are connected at their ends to extension pieces 3, to which a running net 4 is fastened in a way known from DE 1974894262. The connection is in this case designed in such a way that limited relative movements in the radial direction are possible between the holding arms 2 and the extension pieces 3. For fastening the nonskid device to a wheel bolt 5, there are a connection part 6 of the type known from the reference publication and a tension cord 7 which is formed by a flexible belt which, however, is virtually inelastic in the longitudinal direction. The use of a tension cord 7 which is inelastic in the longitudinal direction affords the advantage, as compared with likewise known solutions with elastic tension cords, that the forces by which the running net 4 is held on the tread of a tire during the use of a nonskid device depend solely on the degree of elastic deformation of the holding arms 2. Problems, such as have arisen due to aging phenomena in the use of an elastomeric tension cord, are thus avoided.

Figure 2:
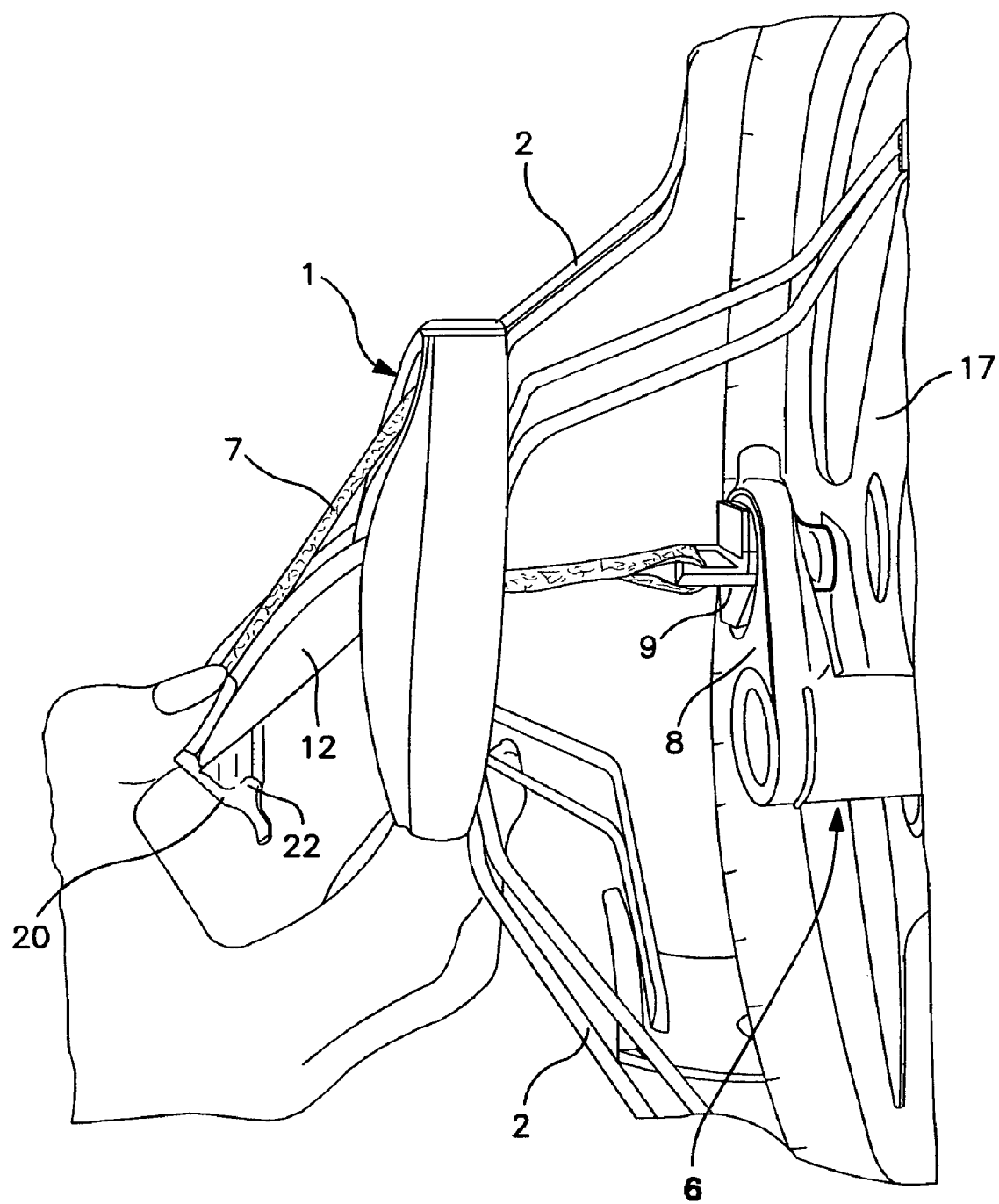
FIG. 2 shows, on an enlarged scale, a detail of FIG. 1 during the application of a tension force.
Figure 3:
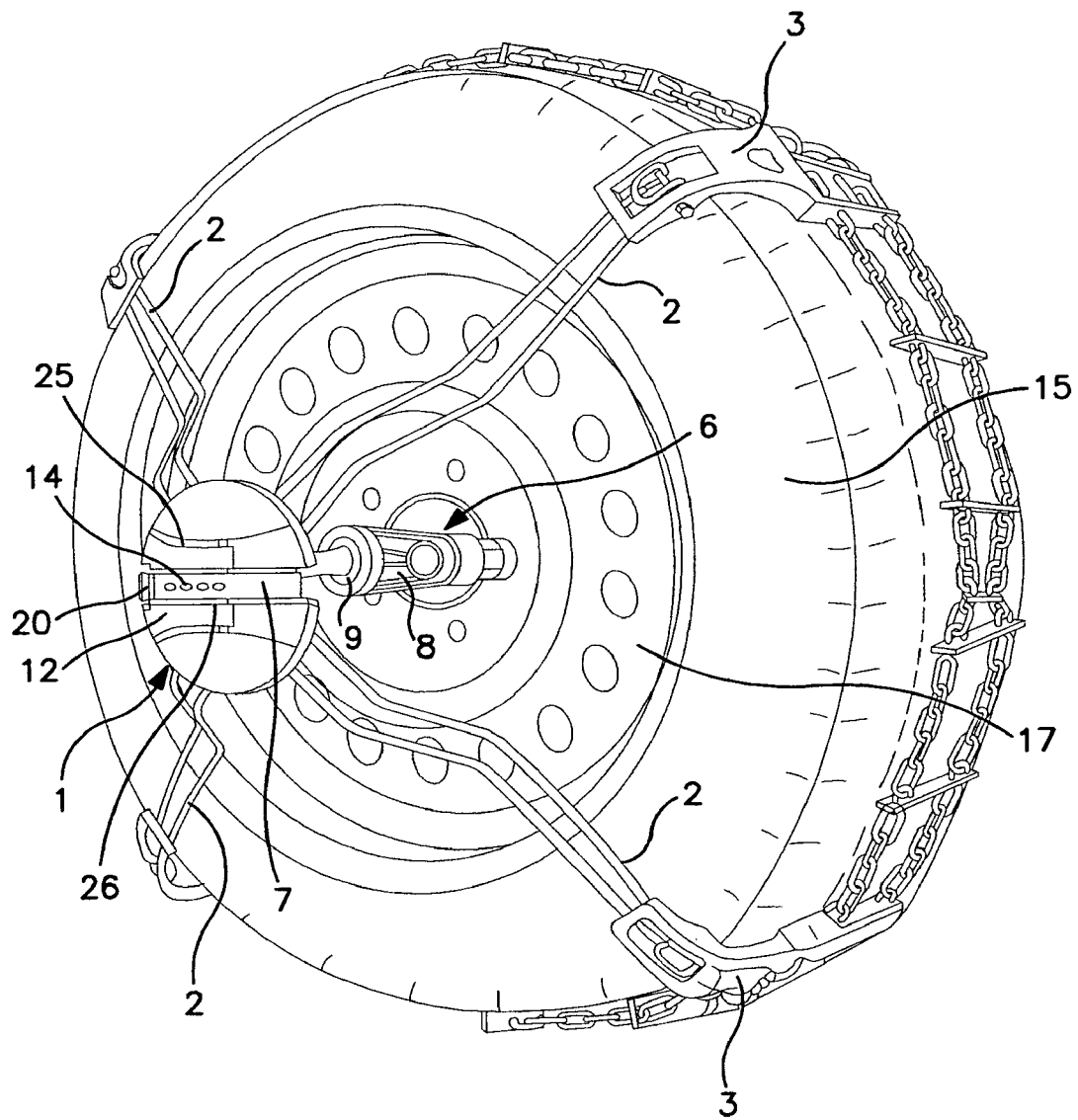
FIG. 3 shows the nonskid device according to FIG. 1 in its end position reached automatically after the starting of the vehicle.
Figure 4:
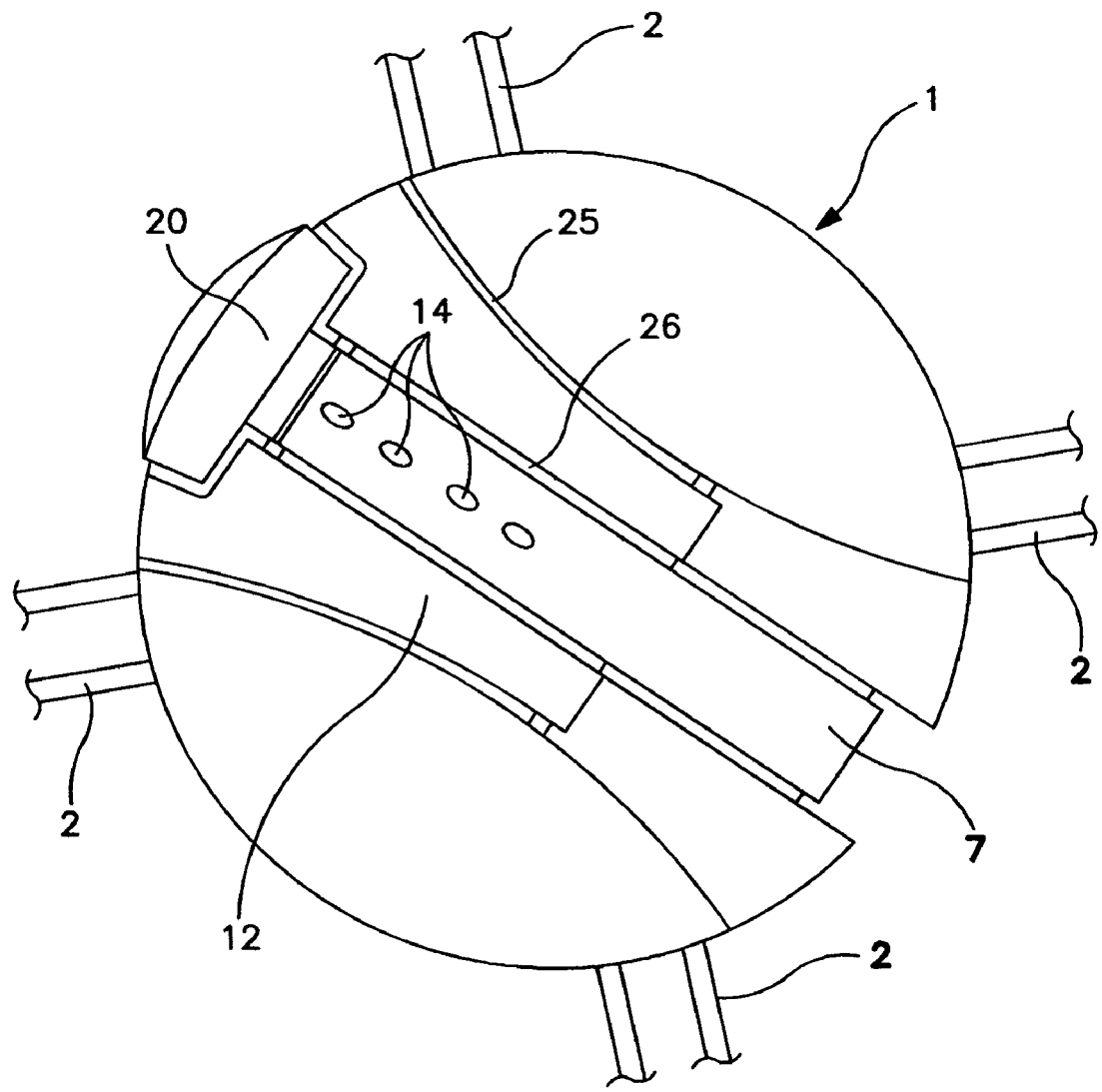
FIG. 4 shows, on an enlarged scale, a top view of the holder of the nonskid device in the end position according to FIG. 3.
Figure 5:
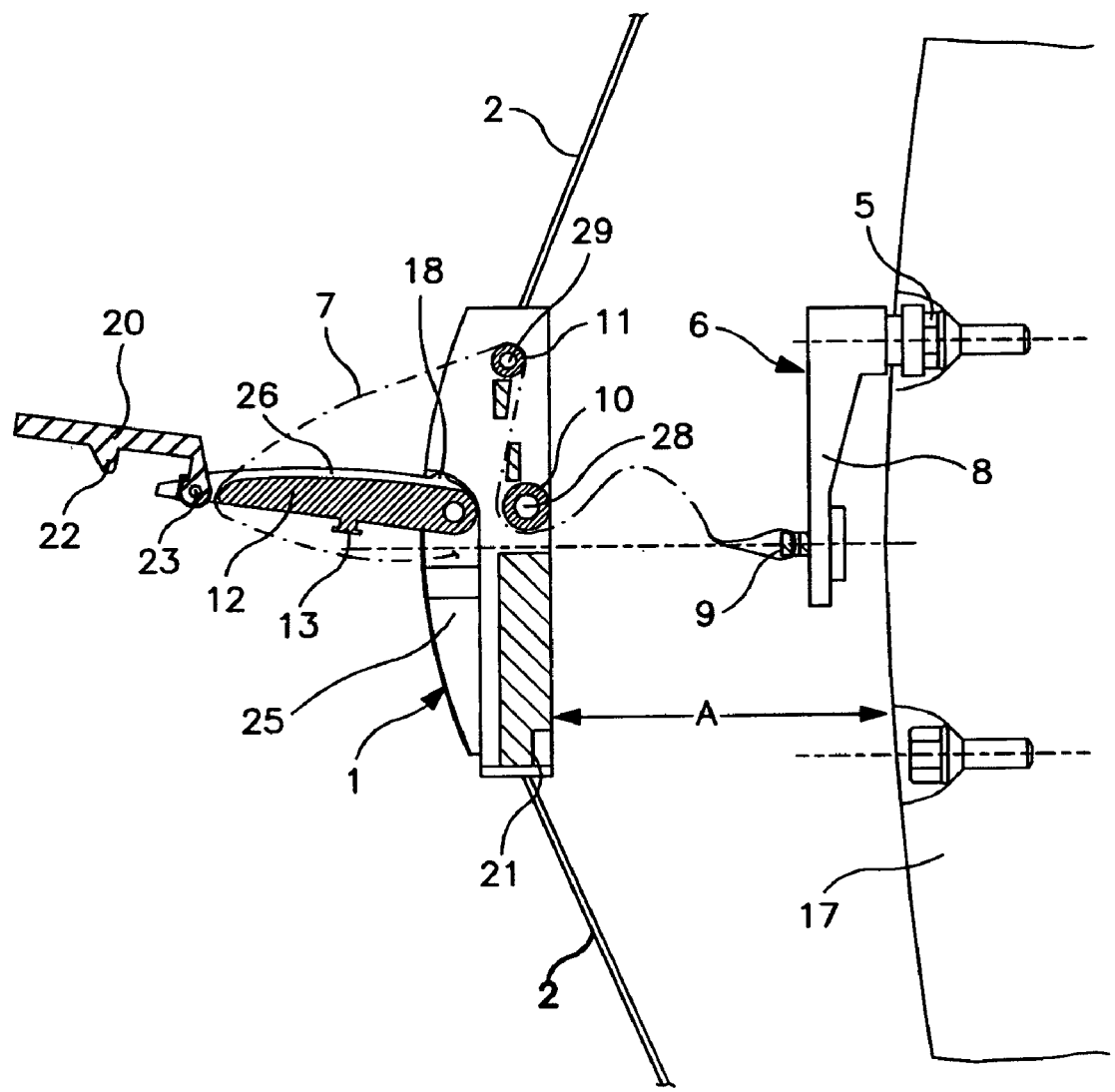
FIG. 5 shows, partially in section, the parts of the nonskid device which are essential to the invention, in the first position of the mounting operation, as illustrated in FIG. 1.
Figure 6:
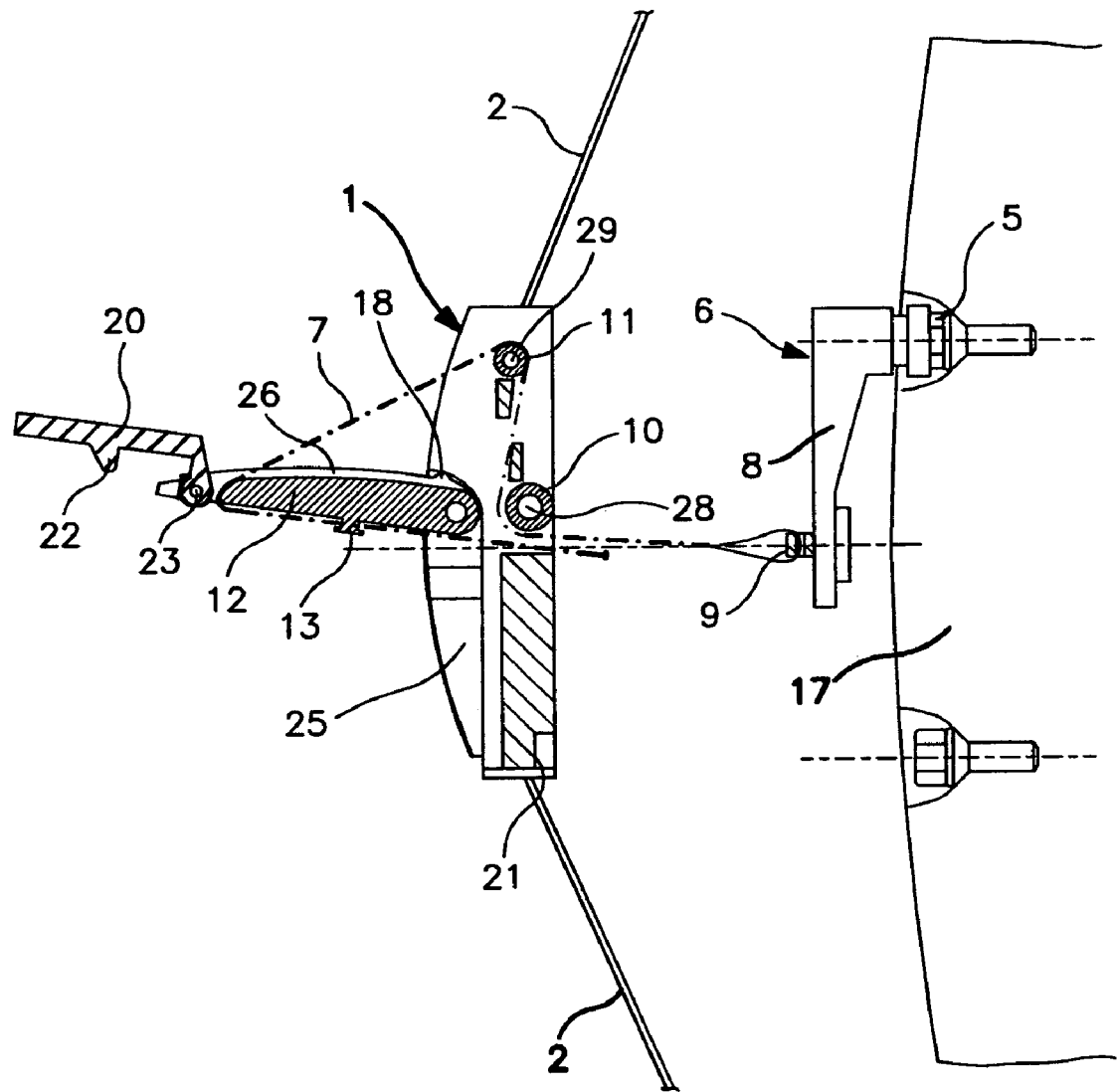
FIG. 6 shows the parts illustrated in FIG. 5 in a second position of the mounting operation.
Figure 7:
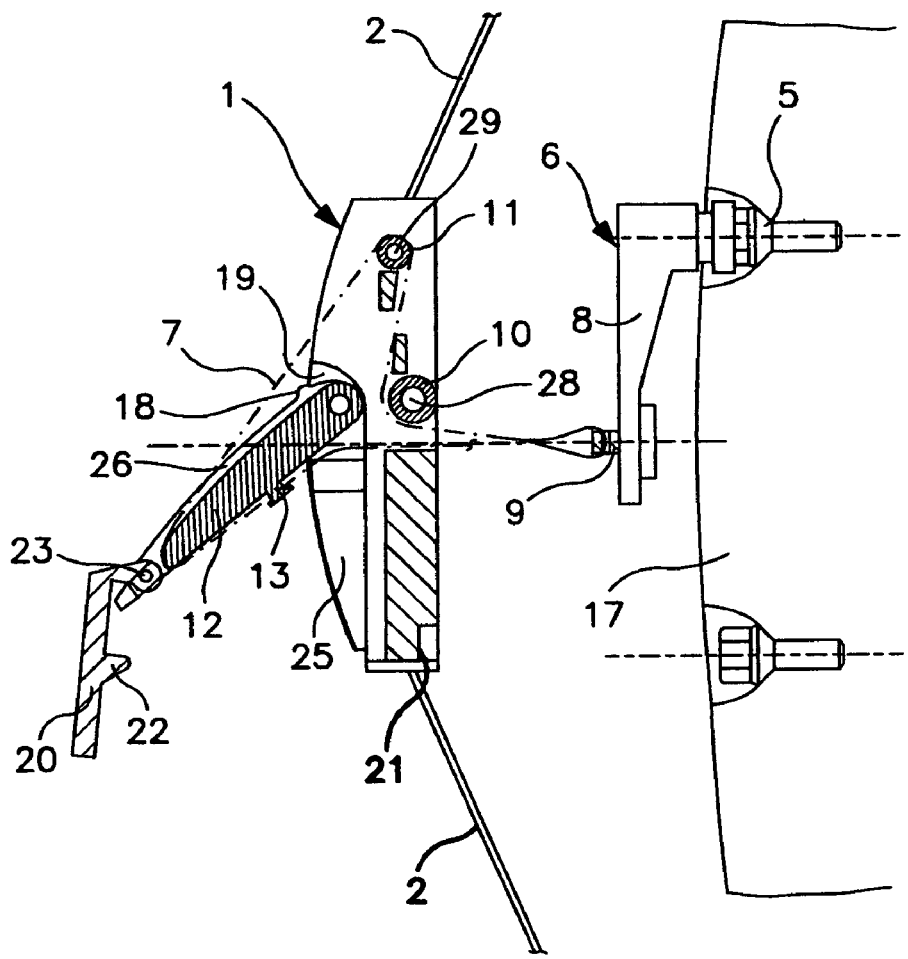
FIG. 7 shows the parts illustrated in FIG. 5 in a third position of the mounting operation.

As is evident from FIG. 2, the tension cord 7 extends from a spinner 9, mounted rotatably at the free end of an extension arm 8 of the connection part 6, to the center of the holder 1. The tension cord passes first through a first deflection 10 which is formed by a pulley 28 and from which it arrives at a second deflection 11, likewise formed by a pulley 29, at the edge region of the holder 1. The tension cord 7 is led from the second deflection 11 into the region of the free end of a tension lever 12, where it is deflected once again. On the inside of the tension lever 12 is arranged a fastening or retaining member 13 which is formed by a mushroom-like projection and which fits in each case into a hole of a row of holes 14 which can be seen in FIGS. 3 and 4 and which is provided in a portion of the tension cord 7 formed by the belt, in order to allow the length of the tension cord 7 to be preset according to the respective conditions. As illustrated in FIGS. 1, 5 and 6, the tension cord 7 is retained virtually free of pull, on the swung-up tension lever 12. The holding arms 2 in this case bear, likewise virtually nondeformed, against the flank 15 of the tire 16. The distance A, depicted in FIG. 5, between the holder and rim 17 of the wheel has in this case a value which depends on the initial form of the holding arms 2. To apply the forces necessary for the satisfactory remaining automatic mounting, when the vehicle equipped with the nonskid device is started, the tension lever 12 is transferred out of the initial position illustrated in FIGS. 1 and 5 into the end position according to FIGS. 3 and 8. FIGS. 2 and 7 show as intermediate position. In the end position, the holder 1 is at a distance a from the rim 17 (cf. FIG. 8) which is smaller than the distance A. Owing to the difference between the distances A and a, when the nonskid device is in the operating state, the holding arms 2 are pressed against the flank 15 of the tire 16 with a force which, on the one hand, is sufficient to bring about the remaining automatic mounting and, on the other hand, ensures a satisfactory fit of the running net 4 on the tread of the tire 16. The risk, existing in the case of known nonskid devices, of the forces with which the holding arms 2 are pressed against the tire flanks 15 assume values detrimental to the creep of the running net on the tire, said creep being conducive to the selfcleaning of the pinning net 4, is thus eliminated.

Figure 5A:
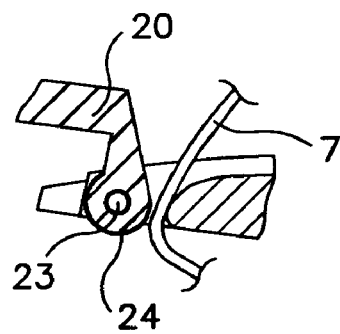
FIG. 5A shows a detail of FIG. 5 on an enlarged scale.
Figure 7A:
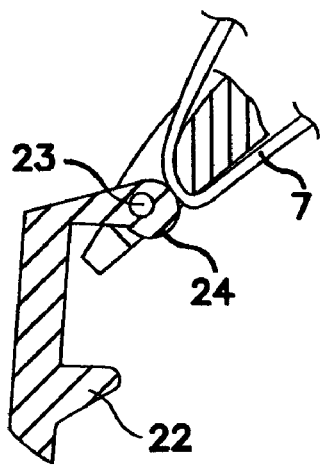
FIG. 7A shows a detail of FIG. 7.

While a latching nose 18 and a latching recess 19 serve for securing the tension lever 12 in its initial position illustrated in FIGS. 1, 5 and 6, the securing of the tension lever 12 in the end position of the latter takes place with the aid of a securing element 20 which is formed by a pivoting tab and which is provided with a projection 22 engaging behind a stop edge 21 of the holder. As can be seen from FIGS. 5A, 7A and 8A, the securing element 20 forms, in the region of its pivot axis 23, a clamping boss 24, by means of which the tension cord 7 is additionally secured against slipping out of place.

To avoid parts projecting beyond the holder 1, the holder 1 is provided with a clearance 25 which receives the tension lever 12 when the nonskid device is in the operating position, while the tension lever 12 has on its outside a guide groove 26 for the tension cord 7.

Figure 8:
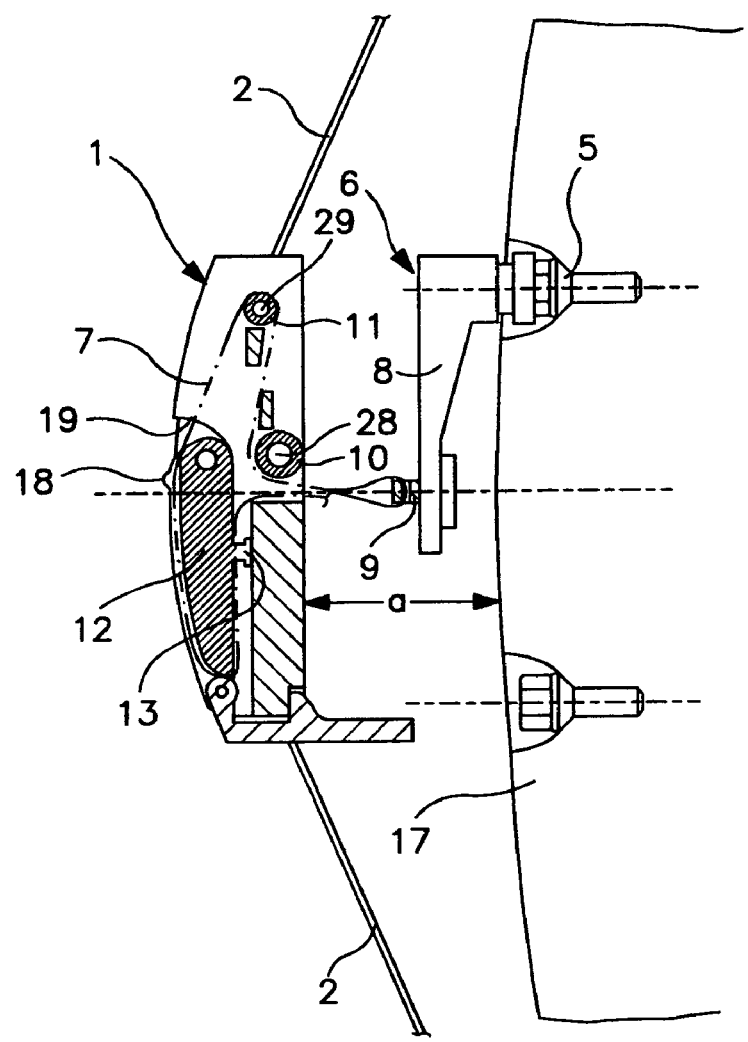
FIG. 8 shows the parts illustrated in FIG. 3 after the conclusion of the mounting operation.
Figure 8A:
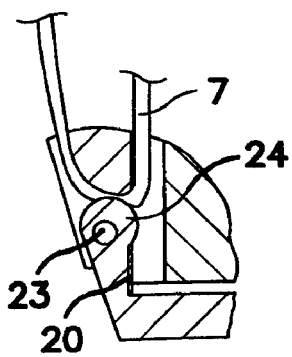
FIG. 8A shows a detail of FIG. 8.
Figure 9:
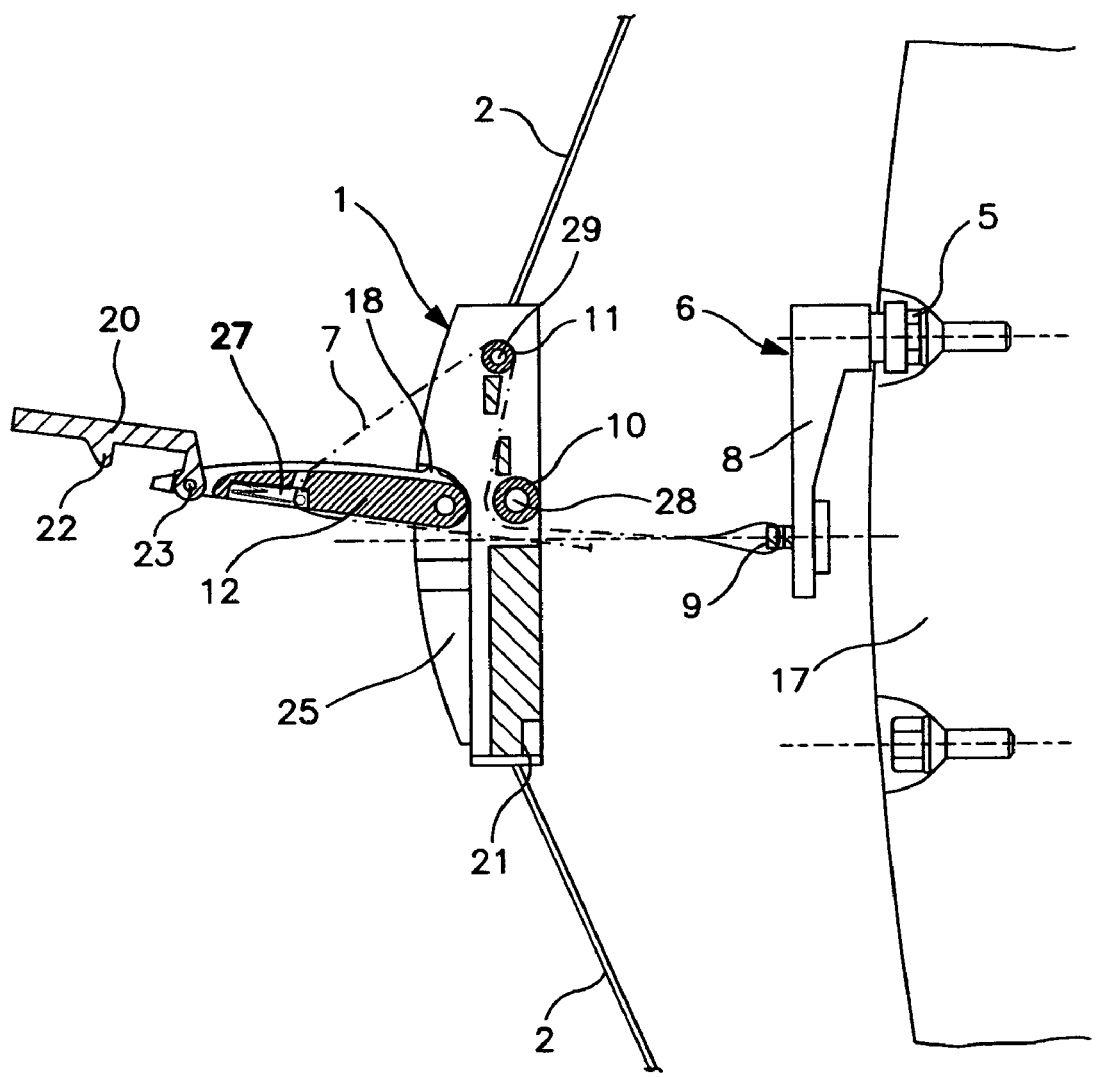
FIG. 9 shows an illustration corresponding to FIG. 6, with a modified detaining member.

While, in the instances illustrated in FIGS. 6, 7 and 8, the mushroom-like projection 13 capable of being pressed into holes of the rows of holes 14 serves for detaining the tension cord 7 in its initial position, in the instance illustrated in FIG. 9, the fastening or detention of the tension cord 7 is carried out by means of a steel clamping clip 27 known per se.

The invention claimed is:

1. A nonskid device for vehicle wheels, with a holder, coming to rest in the region of the wheel axis in a mounted state and rotatable with respect to the wheel, at least three holding arms attached to the holder, said arms extending radially outward, for holding nonskid means distributed over the wheel circumference, and with a tension cord which serves for the introduction of tension forces into the holding arms and connects the holder to the wheel and which runs from the center of the holder where it passes a first deflection to a second deflection located in an edge region of the holder, characterized in that the tension cord (7) runs from the second deflection (11) to at least one retaining member (13) at a tension lever (12) which is mounted pivotably on the holder (1) at a distance from the second deflection (11) and by means of a pivoting movement of said tension lever into a tension position a pull can be introduced into the tension cord (7).

2. The device as claimed in claim 1, characterized in that the deflections (10, 11) are formed by pulleys.

3. The device as claimed in claim 1, characterized in that the tension lever (12) is provided with a securing element (20) retaining it in the tension position.

4. The device as claimed in claim 3, characterized in that the securing element (20) is formed by a pivoting tab which is arranged at a free end of the tension lever (12) and which is provided with a projection (22) engaging behind a stop edge (21) of the holder (1) in the tension position.

5. The device as claimed in claim 3, characterized in that the securing element (20) is equipped with a clamping boss (24) for detaining the tension cord (7) in the tension position.

6. The device as claimed in claim 4, characterized in that the stop edge (21) is formed by a cant, facing the vehicle wheel, of the outer edge of the holder (1).

7. The device as claimed in claim 1, characterized in that the pivoting travel of the tension lever (12) is limited by stops.

8. The device as claimed in claim 1, characterized in that the holder (1) has an inside and an outside and is provided on its outside with a clearance (25) which receives the tension lever (12) in the tension position.

9. The device as claimed in claim 1, characterized in that the tension lever (12) has an inside and an outside, and that the retaining member (13) is arranged on the inside, facing the holder (1) in the tension position, of the tension lever (12).

10. The device as claimed in claim 9, characterized in that the tension cord (7) passes the outside of the tension lever (12) to the retaining member (13) on the inside of the tension lever (12).

11. The device as claimed in claim 1, characterized in that the tension cord (7) is flexible, but is virtually inelastic in the longitudinal direction.

12. The device as claimed in claim 11, characterized in that the tension cord (7) is formed by a belt.

13. The device as claimed in claim 1, characterized in that the tension lever (12) is provided with a guide groove for a portion of the tension cord (7), said portion coming to rest on the outside of said tension lever in the tension position.

14. The device as claimed in claim 1, characterized in that the retaining member (13) is formed by a mushroom-like projection of the tension lever (12).

15. The device as claimed in claim 14, characterized in that the tension cord (7) is provided with a row (14) of holes for receiving the retaining member (13), said row allowing a presetting of the length of that portion of the tension cord (7) which connects the holder (1) to the vehicle wheel.

16. The device as claimed in claim 1, characterized in that the retaining member is formed by a steel clamping clip (27).

17. The device as claimed in claim 1, characterized in that the outer surface of the tension lever (12) transferred into the tension position is in alignment with the outer surface of the holder (1).

18. The device as claimed in claim 1, characterized in that the tension cord (7) is connected to the vehicle wheel by means of a connection part (6) which is provided with means for its releasable fastening to a wheel bolt (5) or wheel nut and which has an extension arm (8) which ends in the region of the wheel axis and on a free end of which the tension cord (7) engages.

19. The device as claimed in claim 18, characterized in that the tension cord (7) is connected to a connection lug of a spinner (9) arranged at the free end of the extension arm (8).

20. A method for mounting a nonskid device as claimed in claim 1, characterized in that the tension cord (7), in a stretched state is retained, virtually free of pull, in a swung-up position of said tension lever (12) and subsequently, by the tension lever (12) being folded into the tension position, is acted upon, along with the elastic deformation of the holding arms (2) by a pull which pulls the holder (1) against the vehicle wheel.

* * * * *